UNITED STATES PATENT OFFICE 2,139,935

THIOCYANIC AND DITHIOCARBAMIC ANHYDRIDES AND THE PROCESS OF MAKING THE SAME

Jean Claudin, Paris, France, assignor to Société Anonyme des Matieres Colorantes & Produits Chimiques de Saint-Denis, Paris, France, a company of France No Drawing. Application July 26, 1935, Serial No. 33,389. In France August 1, 1934

13 Claims. (Cl. 260—545)

This invention relates to new compounds consisting in thiocyanic anhydrides, and to the manufacture of the same.

It is an object of this invention to produce thiocyanic anhydrides which are especially reactive and in this respect are suitable for synthesis of vulcanization accelerators, anti-cryptogamic products, dyestuffs and so on.

By causing cyanogen chloride to act on a solution of sodium dimethyl-dithiocarbamate at temperatures between 20 and 70° C. there is obtained in good yield and in good purity sodium tetramethylthiuram-monosulphide with the formation of sulphocyanide. The reaction proceeds in accordance with the following scheme:

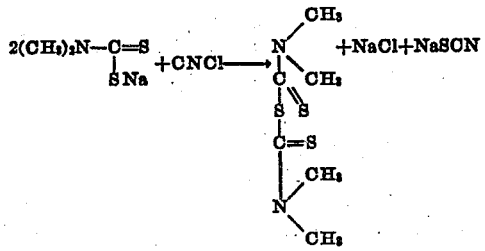

If the temperature at which the cyanogen chloride is introduced is reduced to about 0° C. there is no longer observed the formation of yellow crystals of the sodium thiuram mono-sulphide but white flakes are precipitated; the formation of sulphocyanide cannot be detected and the white product, after having been filtered and washed at about 0° C., constitutes a product which is unstable at ordinary temperature. It has a disagreeable odour and becomes yellow and tarry.

This substance is presumed to constitute an intermediate product in the reaction above referred to and, in fact, if it is mixed with a solution of dimethyl-dithiocarbamate the thiuram-monosulphide is obtained, after a short time, at ordinary temperature. The course of the reaction, is thus as follows—

1st phase:

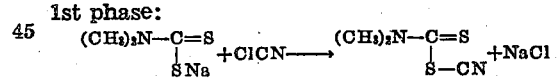

2nd phase:

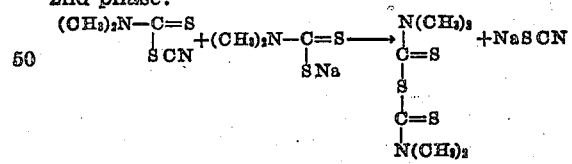

With the aid of the intermediate product (1) it is thus possible to prepare monosulphides of unsymmetrical thiurams, for example, according to the scheme:

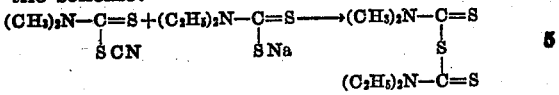

The possibilities in the synthesis of mixed products are illustrated in the table which is given hereinafter., Intermediate products corresponding with the intermediate product (1) can be obtained from all dithiocarbamates of the formula:

in which R and R' may be of any nature, whether aliphatic or aromatic. In this case the intermediate product may be considered as a mixed anhydride of the dithiocarbamic acid and cyanic or thiocyanic acid. The tendency to undergo alteration and the reactivity of these anhydrides of cyanic or thiocyanic acid vary according to the nature of the dithiocarbamate. When R and R' represent the methyl group the cyanic anhydride is very much less stable than in the cases in which R and R' represent groups of higher molecular weight. The anhydrides of the formula:

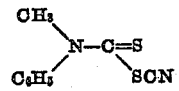

and

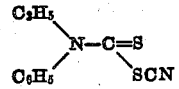

are stable at ordinary temperature for several days. Their reactivity is likewise somewhat lower but is nevertheless sufficient for carrying out all desired condensations.

It has also been found that these cyanic and thiocyanic anhydrides can be made not only by starting with dithiocarbamates, but also by starting from any other derivative of dithiocarbonic acid, for example, the xanthates and the dithiccarbonates. For example, by the action of cyanogen chloride on iso-propyl xanthates at a low temperature there is obtained the cyanic anhydride corresponding with the formula:

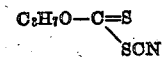

which, like the above described anhydrides of dithiocarbamic acids is obtained in the form of a white precipitate which is very reactive and readily undergoes alteration. As in the case of the dithiocarbamates, the separation of the cyanic or thiocyanic anhydride can be avoided by introducing the cyanogen chloride into the solution of the xanthate at a higher temperature (between 20 and 60° C.). In this case the anhydride which is formed intermediately at once reacts with the xanthate according to the following reactions:

1st reaction:

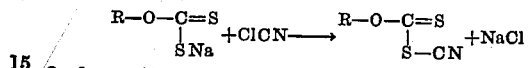

2nd reaction:

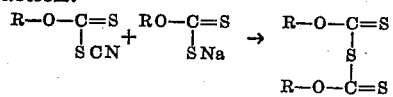

By means of the cyanic or thiocyanic anhydride, which is isolated at a low temperature, it is possible to obtain, by condensation with any xanthates, a large number of mixed monosulphides.

It has also been found that these anhydrides derived from dithiocarbonic acids are capable of reacting not only with derivatives of dithiocarbonates but also with all compounds containing a labile hydrogen atom, sulphocyanic acid being eliminated. The possibilities of synthesis with the aid of these cyanic anhydrides are extraordinarily great and can only be compared with those of the diazo compounds with which it is possible to realize very numerous combinations. Just as it has become possible to synthesize an unlimited number of azodyestuffs thanks to the reactivity of the diazo group, so also is it possible to carry out a very large number of new syntheses, by means of the cyanic or thiocyanic anhydrides, according to the general scheme:

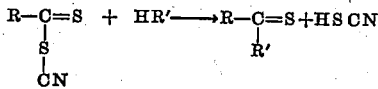

H=labile hydrogen in which R and R' may be of most diverse natures. In the table which is given hereinafter there will be found some instances of the condensation of the cyanic anhydrides with dithiocarbonates and their derivatives, with mercaptans, with amines and with phenols. The variety of the syntheses permits the production of compounds of commercial importance, in some cases as vulcanization accelerators, in other cases as anticryptogamic products, as dyestuffs and so on.

The reactivity and even the existence of these cyanic and thiocyanic anhydrides has hitherto escaped notice. This is indeed not due to lack of published researches on cyanogen chloride. Many condensation products have been obtained with the aid of cyanogen bromide or cyanogen chloride, although I. Traube (B. vol. 18, page 461) has gone so far as to comment on the small reactivity of cyanogen chloride after having attempted unsuccessfully to condense it with hydroxylamine, urea, iodoform and so on. The same author has described the action of cyanogen chloride on meta-aminobenzoic acid (B. vol. 15, page 2113), which yielded meta-cyanamido-benzoic acid with which he was able to carry out the synthesis of guanidine according to the scheme previously applied by Hoffmann to aniline (A. vol. 67, page 129). I. von Braun and A. Trumpler have subjected pentamethylene-sulphide to the action of cyanogen bromide (B. vol. 43, page 550). But they were unable to identify the product of the reaction to which, on hypothetical grounds they attributed the following formula:

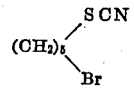

They also succeeded in preparing from dibromopentane and potassium sulphocyanide, an ester, pentamethylene-sulphocyanide, to which they attributed the formula: NCS(CH$_2$)$_5$SCN, but they make no mention of a reactivity approaching that of the anhydrides of the present invention. On the contrary they report on the stability of the product as comparable with that of the di- and tri-methylene sulphocyanides. I. von Braun has investigated the reaction of cyclic bases with cyanogen bromide (B. vol. 40, page 3914, vol. 42, page 2035, vol. 43, pages 550, 1353, 2879, and 3209).

Various authors have investigated the action of cyanogen chloride and cyanogen bromide on organo-magnesium compounds. Karrer has studied their action on hydrocarbons and phenol ethers (Helv. vol. 2, page 482 and vol. 3, page 261).

I. von Braun and Paul Engelbertz have studied the decomposition of mixed organic sulphides by the action of cyanogen bromide and have obtained compounds of the type R—SCN (B. vol. 56, page 1573), but these authors make no mention of any capacity for condensation such as is possessed by the related derivatives of the type:

In U. S. patent to Powers No. 1,674,122 mention is made of the formation of mono-sulphides of alkyl esters of thiocarbonic acids by the action of cyanogen chloride or cyanogen bromide on alkyl xanthates but the possibility of the existence of cyanic or thiocyanic anhydrides, and in consequence the considerable reactivity of these bodies, is not suggested. In fact the proportions between the reactants (about 0.5 mol of cyanogen halide and 1 mol of xanthate) do not preclude but on the contrary enhance the combination of cyanic or thiocyanic anhydride, if formed as an intermediate product, with further xanthate. It has further been found that the group SCN, which is considerably activated in the case of the cyanic anhydrides by the proximity of the group C=S, is likewise capable of reacting with compounds containing labile hydrogen, although in a much less active manner. In this case the products may be regarded as esters of cyanic or thiocyanic acid. These products, unlike the cyanic anhydrides, are already known although their reactivity has not hitherto been recognized. If, for example, cyanogen chloride is introduced into a solution of sodium mercapto-benzothiazolate in the cold there is obtained a white compound which, when carefully recrystallized from alcohol, melts at 89° C. and has the percentage composition S=31.8 per cent, N=14.8 per cent, C=50.3 per cent, H=2.8 per cent, which agrees with the formula:

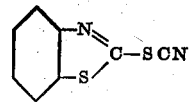

This compound is probably that described in the U. S. Patent to Scott No. 1,838,159. (This compound, having a certain degree of reactivity, when heated towards 120° C. yields a reddish compound of surprising stability).

This cyanic ester is likewise capable of reacting in certain cases like the cyanic anhydrides. With a xanthate, for example, it reacts in the following manner:

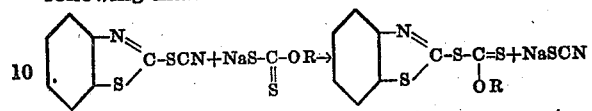

Curiously it reacts with sodium mercaptobenzothiazolate to yield not the monosulphide but the disulphide of benzothiazole, with the formation of sodium cyanide, according to the scheme:

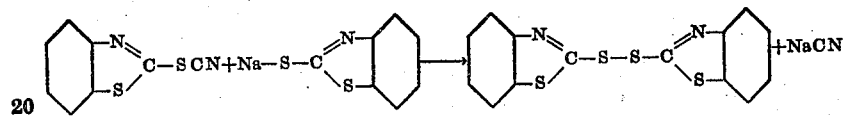

The reactivity of the cyanic anhydrides is thus extended to the thiocyanic esters according to the following two types of reaction:

1.  RSCN+HR′→R—R′+HSCN
2.  R—SCN+HR′→R—S—R′+HCN

The procedure for making the compounds may be as follows:

(a) *Preparation of the cyanic or thiocyanic anhydrides*

Cyanogen chloride is introduced into a solution containing a compound of the formula:

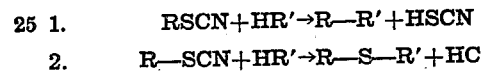

or a salt thereof. The temperature to be observed depends on the nature of the product but, in general, it is necessary to conduct the operation at a temperature approaching 0° C. Formation of the cyanic anhydride either in the liquid or in the solid state is at once observed. Introduction of the cyanogen chloride is discontinued as soon as all trace of the compound

has disappeared. Then the cyanic anhydride is isolated by filtration, decantation or in some other manner.

(b) *Condensation of the cyanic anhydride and ester with a compound containing labile hydrogen*

The cyanic or thiocyanic anhydrides and esters can be condensed with all compounds containing a labile hydrogen atom according to the scheme hereinbefore indicated. For this reaction various media may be used. The formation of sulphocyanide and in certain cases (the cyanic esters) of cyanide can easily be followed; then there is formed the new compound R—X—R′ (X=NH, O, NH—NH and so on).

When the cyanic anhydride is condensed with a molecule of the same compound as that from which it is derived there is obtained a symmetrical product. It is thus possible to obtain, among others, the following symmetrical products, some of which have hitherto not been known:

| | Appearance | Melting point | Observations |
|---|---|---|---|
| | | °C. | |
| S=C—S—C=S<br>OCH₃  OCH₃ | Clear yellow crystals | 54-55 | |
| S=C—S—C=S<br>O  O<br>C₂H₅  C₂H₅ | ....do.... | 55 | |
| S=C—S—C=S<br>O  O<br>C₃H₇  C₃H₇ | Dark yellow crystals | 54-55 | Isopropyl-derivative. |
| S=C—S—C=S<br>O  O<br>C₄H₉  C₄H₉ | Brown oil | | Derivative of the commercial mixture of butyl alcohols. |
| S=C—S—C=S<br>O  O<br>C₅H₁₁  C₅H₁₁ | Yellow oil | | Derivative of the commercial mixture of amyl alcohols. |
| S=C—S—C=S<br>N(CH₃)₂  N(CH₃)₂ | Yellow crystals | 109-110 | |
| 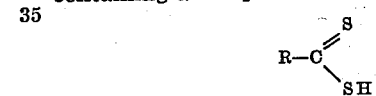 | Cream-white crystals | 178 | |
| CH₃    CH₃<br>N—C—S—C—N<br>C₆H₅  S    S  C₆H₅ | Yellow crystals | 151 | | by condensing cyanic anhydrides of the type:

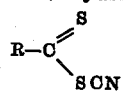

or cyanic esters with other compounds containing labile hydrogen, there can be obtained, among others, the following compounds:

| Structure | Appearance | Melting point °C. | Observations |
|---|---|---|---|
| S=C-S-C=N / N(CH₃)₂ / cyclohexane-S ring | Yellowish-white crystals | 122 | |
| S=C-S-C=N / N(C₂H₅)₂ / cyclohexane-S ring | do | 80 | |
| S=C-S-C=S / N(CH₃)₂  N(C₂H₅)₂ | Yellow crystals | 55 | |
| S=C-S-C=S / N(CH₃)₂  O-CH₃ | do | | Very unstable. |
| S=C-S-C=S / N(CH₃)₂  O-C₂H₅ | do | | Do. |
| S=C-S-C=S / N(CH₃)₂  O-C₃H₇ | Bright yellow crystals | 44 | Very unstable; isopropyl derivative. |
| S=C-S-C=S / N(CH₃)₂  O-C₄H₉ | Yellow oil | | Derivative of commercial butyl alcohol. |
| S=C-S-C=S / N(CH₃)₂  O-C₅H₁₁ | do | | Derivative of commercial isoamyl alcohol. |
| S=C-O-phenyl / N(CH₃)₂ | Dark red oil | | |
| S=C-O-phenyl-NO₂ / N(CH₃)₂ | Yellow crystals | 124 | |
| S=C-O-phenyl-CH₃ (ortho) / N(CH₃)₂ | do | 55 | |
| S=C-O-phenyl-CH₃ (para) / N(CH₃)₂ | Faintly cream crystals | 93 | |
| S=C-O-phenyl(NO₂)(CH₃) / N(CH₃)₂ | Greenish crystals | 136 | |
| S=C-NH-phenyl / N(CH₃)₂ | Clear yellow needles | 127 | |
| S=C-NH-phenyl-CH₃ / N(CH₃)₂ | Colourless crystals | 167 | |

| | Appearance | Melting point | Observations |
|---|---|---|---|
| S=C—NH—⟨⟩—OCH₃ <br> ‖ <br> N <br> (CH₃)₂ | Yellow crystals | °C. <br> 123 | |
| S=C—N(CH₃)—⟨⟩ <br> ‖ <br> N <br> (CH₃)₂ | Straw-coloured crystals | 79 | |
| S=C—S—C=N <br> │   ╲S╱⟨⟩ <br> CH₃ <br> N <br> │ <br> C₆H₅ | ......do...... | 112 | |
| S=C—S—C=N <br> │   ╲S╱⟨⟩ <br> C₂H₅ <br> N <br> │ <br> C₆H₅ | Cream-white crystals | 118 | |

The foregoing list of products obtainable by the invention is in no way limitative but represents only some products selected at random from the numerous possible combinations. Many of these compounds are of industrial importance as vulcanization accelerators and anticryptogamic products.

All the reactions which have been hereinbefore described or referred to can be conducted under similar conditions with other cyanogen halides and, in particular, with cyanogen bromide.

In the appended claims, the expression "alcohol radical" is used to mean the monovalent radical resulting from the elimination of the hydrogen atom from the hydroxy group characterizing the alcoholic function of an alcohol, (thus for instance, ethanol radical means C₂H₅O); similarly the expression "amine radical" is used to mean the monovalent radical resulting from the elimination of one hydrogen atom from the amino group characterizing an amine (thus, for instance, monomethylamine radical means CH₃.NH—).

What I claim is:

1. The method which comprises reacting at a temperature of about 0° C. an alkali metal salt of dimethyl dithiocarbamic acid with an amount of a cyanogen halide at least sufficient to convert the whole amount of said salt to cyanic anhydride of the formula

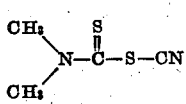

so as to avoid further reaction of the latter with free alkali metal salt of dimethyldithiocarbamic acid, whereby the anhydride is precipitated as white flakes, and isolating said anhydride from the cooled solution.

2. The method which comprises cooling to a temperature of about 0° C. an aqueous solution of sodium dimethyldithiocarbamate, reacting the same at said temperature with a large amount of cyanogen chloride so as to precipitate the whole dimethyldithiocarbamate as white flakes of a cyanic anhydride of the formula

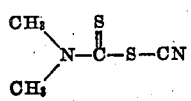

and isolating the flakes from the solution at said temperature.

3. The method which comprises cooling to a temperature of about 0° C. an aqueous solution of sodium methylphenyldithiocarbamate, reacting the same at said temperature with an amount of cyanogen chloride at least sufficient to convert the whole amount of sodium methylphenyldithiocarbamate to a cyanic anhydride of the formula

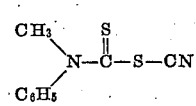

and isolating the said anhydride from the solution.

4. A cyanic anhydride of the formula

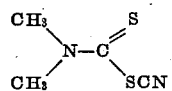

being a white product, unstable at ordinary temperature, having a disagreeable odor.

5. A method for the manufacture of cyanic anhydride which comprises reacting at a temperature of about 0° C. a compound of the formula

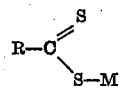

wherein R is one of a group consisting of dialkylamino, diarylamino, arylalkylamino, and alkoxy radicals, and M is a monovalent metal, with at least one equivalent weight of cyanogen halide.

6. A method for the manufacture of cyanic anhydride which comprises reacting at a temperature of about 0° C. a compound of the formula

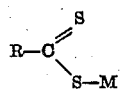

wherein R is a dialkylamino radical and M is a monovalent metal, with at least one equivalent weight of cyanogen halide.

7. A method for the manufacture of cyanic anhydride which comprises reacting at a temperature of about 0° C. a compound of the formula

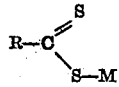

wherein R is a diarylamino radical and M is a monovalent metal, with at least one equivalent weight of cyanogen halide.

8. A method for the manufacture of cyanic anhydride which comprises reacting at a temperature of about 0° C. a compound of the formula

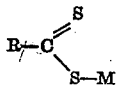

wherein R is an arylalkylamino radical and M is a monovalent metal, with at least one equivalent weight of cyanogen halide.

9. A method for the manufacture of cyanodithiocarbamic compounds, which comprises reacting at a temperature of about 0° C. a dithiocarbamic compound of the formula

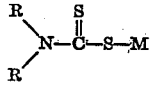

wherein M denotes a monovalent metal and R is an alkyl radical, with an amount of a cyanogen halide at least sufficient to effect substitution of CN for the whole amount of M in the dithiocarbamic compound and separating the cyano-dithiocarbamic compound thus produced.

10. A compound of the formula

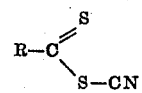

wherein R is one of a group consisting of dialkylamino, diarylamino, arylalkylamino and alkoxy radicals.

11. A compound of the formula

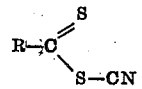

wherein R is a dialkylamino radical.

12. A compound of the formula

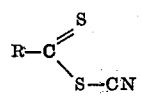

wherein R is a diarylamino radical.

13. A compound of the formula

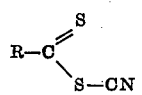

wherein R is an arylalkylamino radical.

JEAN CLAUDIN.